(12) United States Patent
Gerein

(10) Patent No.: US 6,922,167 B2
(45) Date of Patent: Jul. 26, 2005

(54) HARDWARE ARCHITECTURE FOR PROCESSING GALILEO ALTERNATE BINARY OFFSET CARRIER (ALTBOC) SIGNALS

(75) Inventor: Neil Gerein, Okotoks (CA)

(73) Assignee: European Space Agency, Paris (FR)

( * ) Notice: Subject to any disclaimer, the term of this patent is extended or adjusted under 35 U.S.C. 154(b) by 0 days.

(21) Appl. No.: 10/681,689

(22) Filed: Oct. 8, 2003

(65) Prior Publication Data

US 2005/0012664 A1 Jan. 20, 2005

Related U.S. Application Data

(60) Provisional application No. 60/487,180, filed on Jul. 14, 2003.

(51) Int. Cl.[7] .............................. G01S 5/02; H04B 7/185
(52) U.S. Cl. .............................. 342/357.12; 342/357.06; 701/213
(58) Field of Search ....................... 342/357.12, 357.06; 701/213

(56) References Cited

U.S. PATENT DOCUMENTS

| | | | | |
|---|---|---|---|---|
| 4,894,662 A | * | 1/1990 | Counselman | 342/357.12 |
| 4,894,842 A | * | 1/1990 | Broekhoven et al. | 375/150 |
| 5,736,961 A | | 4/1998 | Fenton et al. | |
| 2003/0231580 A1 | * | 12/2003 | Martin et al. | 370/203 |
| 2004/0071200 A1 | * | 4/2004 | Betz et al. | 375/152 |

OTHER PUBLICATIONS

F. Bastide, et al., "Analysis of LS/RS Acquisition, Tracking and Data Demodulation Thresholds" Proceedings of the Institute of Navigation, (ION), GPS, Sep. 2002, pp. 2196–2207.

(Continued)

*Primary Examiner*—Gregory C. Issing
(74) *Attorney, Agent, or Firm*—Cesari and McKenna, LLP

(57) ABSTRACT

A GNSS receiver tracks the AltBOC (15,10), or composite E5a and E5b, codes using hardware that locally generates the complex composite signal by combining separately generated real and the imaginary components of the complex signal. To track the dataless composite pilot code signals that are on the quadrature channel of the AltBOC signal, the receiver operates PRN code generators that produce replica E5a and E5b PRN codes and square wave generators that generate the real and imaginary components of the upper and lower subcarriers, and combines the signals to produce a locally generated complex composite code. The receiver removes the complex composite code from the received signal by multiplying the received signal, which has been downconverted to baseband I and Q signal components, by the locally generated complex composite code. The receiver then uses the results, which are correlated I and Q prompt signal values, to estimate the center frequency carrier phase angle tracking error. The error signal is used to control a numerically controlled oscillator that operates in a conventional manner, to correct the phase angle of the locally generated center frequency carrier. The receiver also uses early and late versions of the locally generated complex composite pilot code in a DLL, and aligns the locally generated composite pilot code with the received composite pilot code by minimizing the corresponding DLL error signal. Once the receiver is tracking the composite pilot code, the receiver determines its pseudorange and global position in a conventional manner. The receiver also uses a separate set of correlators to align locally generated versions of the in-phase composite PRN codes with the in-phase channel codes in the received signal, and thereafter, recover the data that is modulated thereon.

11 Claims, 11 Drawing Sheets

OTHER PUBLICATIONS

L. Ries, et al., "A Softare Simulation Tool for GNSS2 BOC Signals Analysis" Proceedings of the Institute of Navigation, GPS, Sep. 2002, pp. 2225–2239.

F. Dovis et al., "SDR Technology Applied to Galileo Receivers", Proceedings of the Institute of Navigation, GPS, Sep. 2002, pp. 2566–2575.

G.W. Hein, et al., "Status of Galileo Frequency and Signal Design", Proceedings of the Institute of Navigation, GPS, Sep. 2002, pp. 266–277.

Hein, Gunther et al, "Status of Galileo Frequency and Signal Design," ION GPS 2002, Sep. 2002.*

Ganguly, Dr. Suman, "Real–time Dual Frequency Software Reciever," 2003 IEEE Plans, Apr. 2004, pp. 366–374.*

* cited by examiner

| $R_1$ | -1 | 1 | -1 | 1 |
|---|---|---|---|---|
| $R_2$ | -1 | -1 | 1 | 1 |
| $R_1+R_2$ | -2 | 0 | 0 | 2 |
| $R_2-R_1$ | 0 | -2 | 2 | 0 |

FIG. 7

HARDWARE ARCHITECTURE FOR PROCESSING GALILEO ALTERNATE BINARY OFFSET CARRIER (ALTBOC) SIGNALS

CROSS-REFERENCE TO RELATED APPLICATIONS

The present application claims the benefit of U.S. Provisional Patent Application Serial No. 60/487,180, which was filed on Jul. 14, 2003, by Neil Gerein for A HARDWARE ARCHITECTURE FOR PROCESSING GALILEO ALTERNATE BINARY OFFSET CARRIER (AltBOC) SIGNALS and is hereby incorporated by reference.

BACKGROUND OF THE INVENTION

1. Field of the Invention

The invention relates generally to GNSS receivers and, in particular, to receivers that operate with Galileo AltBOC satellite signals.

2. Background Information

Global navigation satellite system (GNSS) receivers, such as GPS receivers, determine their global positions based on the signals received from orbiting GPS and other satellites. The GPS satellites, for example, transmit signals using two carriers, namely, an L1 carrier at 1575.42 MHz and an L2 carrier at 1227.60 MHz. Each carrier is modulated by at least a binary pseudorandom (PRN) code, which consists of a seemingly random sequence of ones and zeros that periodically repeat. The ones and zeros in the PRN code are referred to as "code chips," and the transitions in the code from one to zero or zero to one, which occur at "code chip times," are referred to as "bit transitions." Each GPS satellite uses a unique PRN code, and thus, a GPS receiver can associate a received signal with a particular satellite by determining which PRN code is included in the signal.

The GPS receiver calculates the difference between the time a satellite transmits its signal and the time that the receiver receives the signal. The receiver then calculates its distance, or "pseudorange," from the satellite based on the associated time difference. Using the pseudoranges from at least four satellites, the receiver determines its global position.

To determine the time difference, the GPS receiver synchronizes a locally generated PRN code with the PRN code in the received signal by aligning the code chips in each of the codes. The GPS receiver then determines how much the locally-generated PRN code is shifted, in time, from the known timing of the satellite PRN code at the time of transmission, and calculates the associated pseudorange. The more closely the GPS receiver aligns the locally-generated PRN code with the PRN code in the received signal, the more precisely the GPS receiver can determine the associated time difference and pseudorange and, in turn, its global position.

The code synchronization operations include acquisition of the satellite PRN code and tracking the code. To acquire the PRN code, the GPS receiver generally makes a series of correlation measurements that are separated in time by a code chip. After acquisition, the GPS receiver tracks the received code. It generally makes "early-minus-late" correlation measurements, i.e., measurements of the difference between (i) a correlation measurement associated with the PRN code in the received signal and an early version of the locally-generated PRN code, and (ii) a correlation measurement associated with the PRN code in the received signal and a late version of the local PRN code. The GPS receiver then uses the early-minus-late measurements in a delay lock loop (DLL), which produces an error signal that is proportional to the misalignment between the local and the received PRN codes. The error signal is used, in turn, to control the PRN code generator, which shifts the local PRN code essentially to minimize the DLL error signal.

The GPS receiver also typically aligns the satellite carrier with a local carrier using correlation measurements associated with a punctual version of the local PRN code. To do this the receiver uses a carrier tracking phase lock loop.

A GPS receiver receives not only line-of-sight, or direct path, satellite signals but also multipath signals, which are signals that travel along different paths and are reflected to the receiver from the ground, bodies of water, nearby buildings, etc. The multipath signals arrive at the GPS receiver after the direct-path signal and combine with the direct-path signal to produce a distorted received signal. This distortion of the received signal adversely affects code synchronization operations because the correlation measurements, which measure the correlation between the local PRN code and the received signal, are based on the entire received signal—including the multipath components thereof. The distortion may be such that the GPS receiver attempts to synchronize to a multipath signal instead of to the direct-path signal. This is particularly true for multipath signals that have code bit transitions that occur close to the times at which code bit transitions occur in the direct-path signal.

One way to more accurately synchronize the received and the locally-generated PRN codes is to use the "narrow correlators" discussed in U.S. Pat. Nos. 5,101,416; 5,390,207 and 5,495,499, all of which are assigned to a common assignee and incorporated herein by reference. It has been determined that narrowing the delay spacing between early and late correlation measurements substantially reduces the adverse effects of noise and multipath signal distortion on the early-minus-late measurements.

The delay spacing is narrowed such that the noise correlates in the early and late correlation measurements. Also, the narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak. The closer the correlators are placed to the correlation peak, the more the adverse effects of the multipath signals on the correlation measurements are minimized. The delay spacing can not, however, be made so narrow that the DLL can not lock to the satellite PRN code and then maintain code lock. Otherwise, the receiver cannot track the PRN code in the received signal without repeatedly taking the time to re-lock to the code.

The L1 carrier is modulated by two PRN codes, namely, a 1.023 MHz C/A code and a 10.23 MHz P-code. The L2 carrier is modulated by the P-code. Generally, a GPS receiver constructed in accordance with the above-referenced patents acquires the satellite signal using a locally generated C/A code and a locally generated L1 carrier. After acquisition, the receiver synchronizes the locally generated C/A code and L1 carrier with the C/A code and L1 carrier in the received signal, using the narrow correlators in a DLL and a punctual correlator in the carrier tracking loop. The receiver may then use the C/A code tracking information to track the L1 and/or L2 P-codes, which have known timing relationships with the C/A code, and with each other.

In a newer generation of GPS satellites, the L2 carrier is also modulated by a C/A code that is, in turn, modulated by a 10.23 MHz square wave. The square wave modulated C/A code, which we refer to hereinafter as the "split C/A code," has maximums in its power spectrum at offsets of ±10 MHz from the L2 carrier, or in the nulls of the power spectrum of the P-code. The split C/A code can thus be selectively jammed, as necessary, without jamming the L2 P-code.

The autocorrelation function associated with the split C/A code has an envelope that corresponds to the autocorrelation of the 1.023 MHz C/A code and multiple peaks within the envelope the correspond to the autocorrelation of the 10.23 MHz square wave. There are thus 20 peaks within a two chip C/A code envelope, or a square wave autocorrelation peak every 0.1 C/A code chips. The multiple peaks associated with the square wave are each relatively narrow, and thus, offer increased code tracking accuracy, assuming the DLL tracks the correct narrow peak.

As discussed in U.S. Pat. No. 6,184,822 which is assigned to a common Assignee and incorporated herein by reference, there are advantages to acquiring and tracking the split-C/A code by separately aligning with the received signal the phases of a locally-generated 10.23 MHz square wave, which can be thought of as a 20.46 MHz square-wave code, and a locally-generated 1.023 MHz C/A code. The receiver first aligns the phase of the locally generated square-wave code with the received signal, and tracks one of the multiple peaks of the split-C/A code autocorrelation function. It then shifts the phase of the locally-generated C/A code with respect to the phase of the locally-generated square-wave code, to align the local and the received C/A codes and position the correlators on the center peak of the split-C/A. The receiver then tracks the center peak directly, with a locally generated split-C/A code.

The European Commission and the European Space Agency (ESA) are developing a GNSS known as Galileo. Galileo satellites will transmit signals in the E5a band (1176.45 MHz) and E5b band (1207.14 MHz) as a composite signal with a center frequency of 1195.795 MHz using a proposed modulation known as Alternate Binary Offset Carrier (AltBOC). The generation of the AltBOC signal is described in the Galileo Signal Task Force document "Technical Annex to Galileo SRD Signal Plans", Draft 1, 18 Jul. 2001, ref # STF-annexSRD-2001/003, which is incorporated herein in its entirety by reference. Like the GPS satellites, the GNSS satellites each transmit unique PRN codes and a GNSS receiver can thus associate a received signal with a particular satellite. Accordingly, the GNSS receiver determines respective pseudoranges based on the difference between the times the satellites transmit the signals and then times the receiver receives the AltBOC signals.

A standard binary offset carrier (BOC) modulates a time domain signal by a sine wave $\sin(w_0 t)$, which shifts the frequency of the signal to both an upper sideband and a corresponding lower sideband. The BOC modulation accomplishes the frequency shift using a square wave, or $\text{sign}(\sin(w_0 t))$, and is generally denoted as $\text{BOC}(f_s, f_c)$, where $f_s$ is the subcarrier (square wave) frequency and $f_c$ is the spreading code chipping rate. The factors of 1.023 MHz are usually omitted from the notation for clarity so a BOC(15.345 MHz, 10.23 MHz) modulation is denoted BOC(15,10). The BOC modulation, which produces, for example, signals that are similar to the split C/A code discussed above, allows a single spreading, or PRN, code on each of the in-phase and quadrature carriers.

The modulation of a time domain signal by a complex exponential $e^{w_0 t}$ shifts the frequency of the signal to the upper sideband only. The goal of the AltBOC modulation is to generate in a coherent manner the E5a and E5b bands, which are respectively modulated by complex exponentials, or subcarriers, such that the signals can be received as a wideband "BOC-like signal." The E5a and E5b bands each have associated in-phase and quadrature spreading, or PRN, codes, with the E5a codes shifted to the lower sideband and the E5b codes shifted to the upper sideband. The respective E5a and E5b quadrature carriers are modulated by dataless pilot signals, and the respective in-phase carriers are modulated by both PRN codes and data signals. A GNSS receiver may track either the E5a codes or the E5b codes in a manner that is similar to the tracking of the split C/A code discussed above.

There are, however, advantages in both multipath mitigation and tracking accuracy associated with tracking the composite E5a and E5b signals, that is, tracking the wideband AltBOC coherent signal. The respective inphase and quadrature carriers of the composite signal are modulated by complex spreading codes, and thus, the in-phase and quadrature channels each include contributions from both real and imaginary signal components of the E5a and E5b codes. Theoretical analyses of the composite tracking operations have been made using high level mathematics. Accordingly, the associated receivers, which essentially reproduce the high-level mathematical operations, are expected to be both complicated and costly.

One proposed receiver produces local versions of the AltBOC composite codes using the same look-up tables that the Galileo satellites use to generate the signals for transmission, that is, the tables that correspond to the underlying phase shift keying (PSK) spreading codes. The proposed receiver must thus not only maintain large look-up tables for each of the codes transmitted by the respective Galileo satellites, the receiver must also operate complex circuitry that controls entry to the look-up tables each time a new code chip is received. The tables are even larger and entering them more complicated when different pilot codes are used on the E5a and E5b bands, as is now contemplated.

SUMMARY

The invention is a GNSS receiver that tracks the AltBOC (15,10), or composite E5a and E5b , codes using hardware that locally generates the complex composite signal by combining separately generated real and the imaginary components of the complex signal. To track the dataless composite pilot code signals that are on the quadrature channel of the AltBOC signal, for example, the receiver produces a local version of the composite pilot code as a combination of the locally generated real and imaginary pilot signal components. The receiver thus operates PRN code generators that produce replica E5a and E5b PRN codes and square wave generators that generate the real and imaginary components of the upper and lower subcarriers.

The receiver removes the complex composite code from the received signal by multiplying the received signal, which has been downconverted to baseband I and Q signal components, by the locally generated complex composite code. The receiver then uses the results, which are correlated I and Q prompt signal values, to estimate the center frequency carrier phase angle tracking error. The error signal is used to control a numerically controlled oscillator that operates in a conventional manner, to correct the phase angle of the locally generated center frequency carrier. The receiver also uses early and late versions of the locally generated complex composite pilot code in a DLL, and aligns the locally generated composite pilot code with the received composite pilot code by minimizing the corresponding DLL error signal.

Once the receiver is tracking the composite pilot code, the receiver determine its pseudorange and global position in a conventional manner. Further, as discussed in more detail below, the receiver uses a separate set of correlators to align locally generated versions of the in-phase composite PRN codes with the in-phase channel codes in the received signal, and thereafter, recover the data that is modulated thereon.

BRIEF DESCRIPTION OF THE DRAWINGS

The invention description below refers to the accompanying drawings, of which:

FIG. 7 is a chart of idealized autocorrelation values;

DETAILED DESCRIPTION OF AN ILLUSTRATIVE EMBODIMENT

The Galileo AltBOC modulation scheme generates an AltBOC (15,10) signal that is a "BOC(15,10)-like" signal with the E5a and E5b bands having their own respective spreading, or PRN, codes on their in-phase and quadrature carriers. The AltBOC (15,10) signal has a center carrier frequency of 1191.795 HMz and a subcarrier frequency of 15.345 MHz, with the E5a band (1176.45 MHz) as the lower sideband and the E5b band (1207.14 MHz) as the upper sideband.

Figure 1:
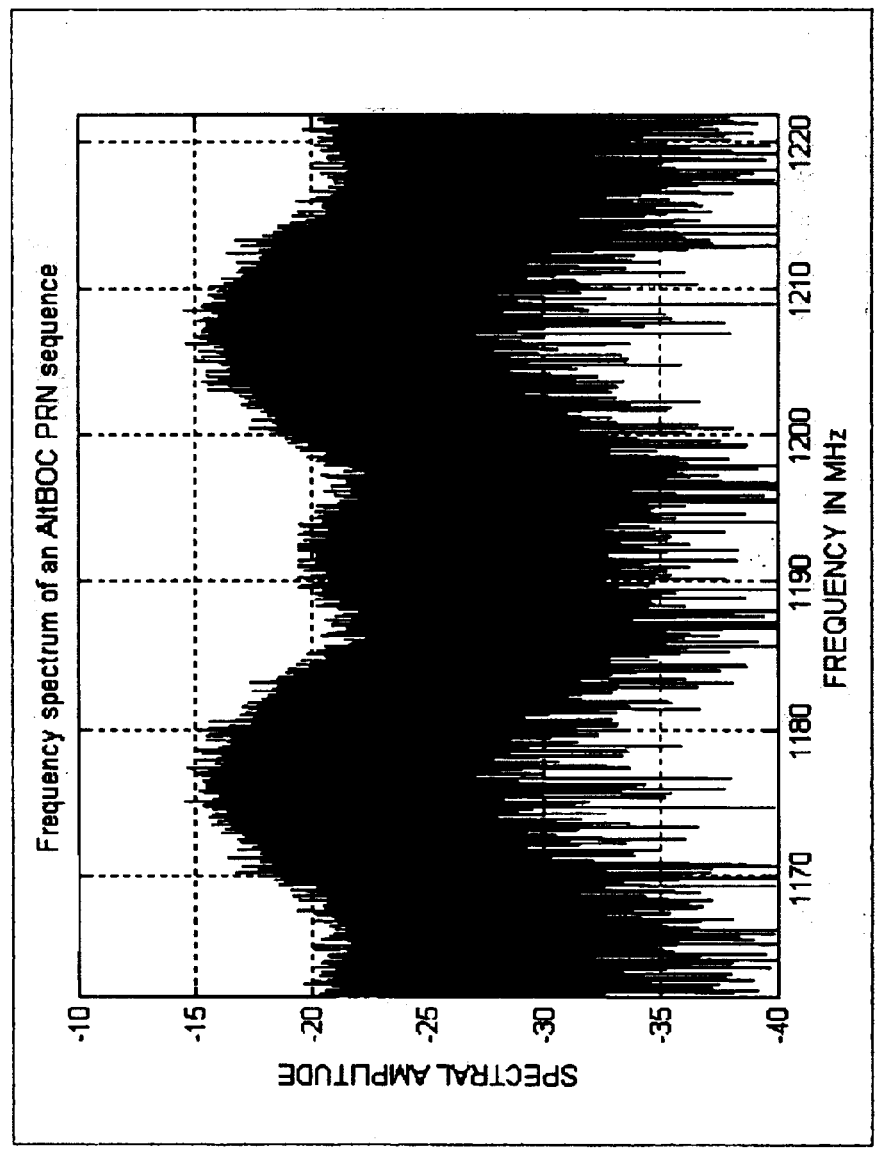
FIG. 1 depicts the frequency spectrum of the AltBOC (15,10) quadrature channel sequence.

The AltBOC (15,10) signal is generated on the satellite as a constant envelope signal that includes on the in-phase channel a composite of the E5a and E5b spreading, or PRN, codes and data, on the quadrature channel and a composite of the E5a and E5b dataless PRN, or pilot, codes. FIG. 1 depicts the frequency spectrum of an AltBOC PRN quadrature channel sequence.

Figure 2:
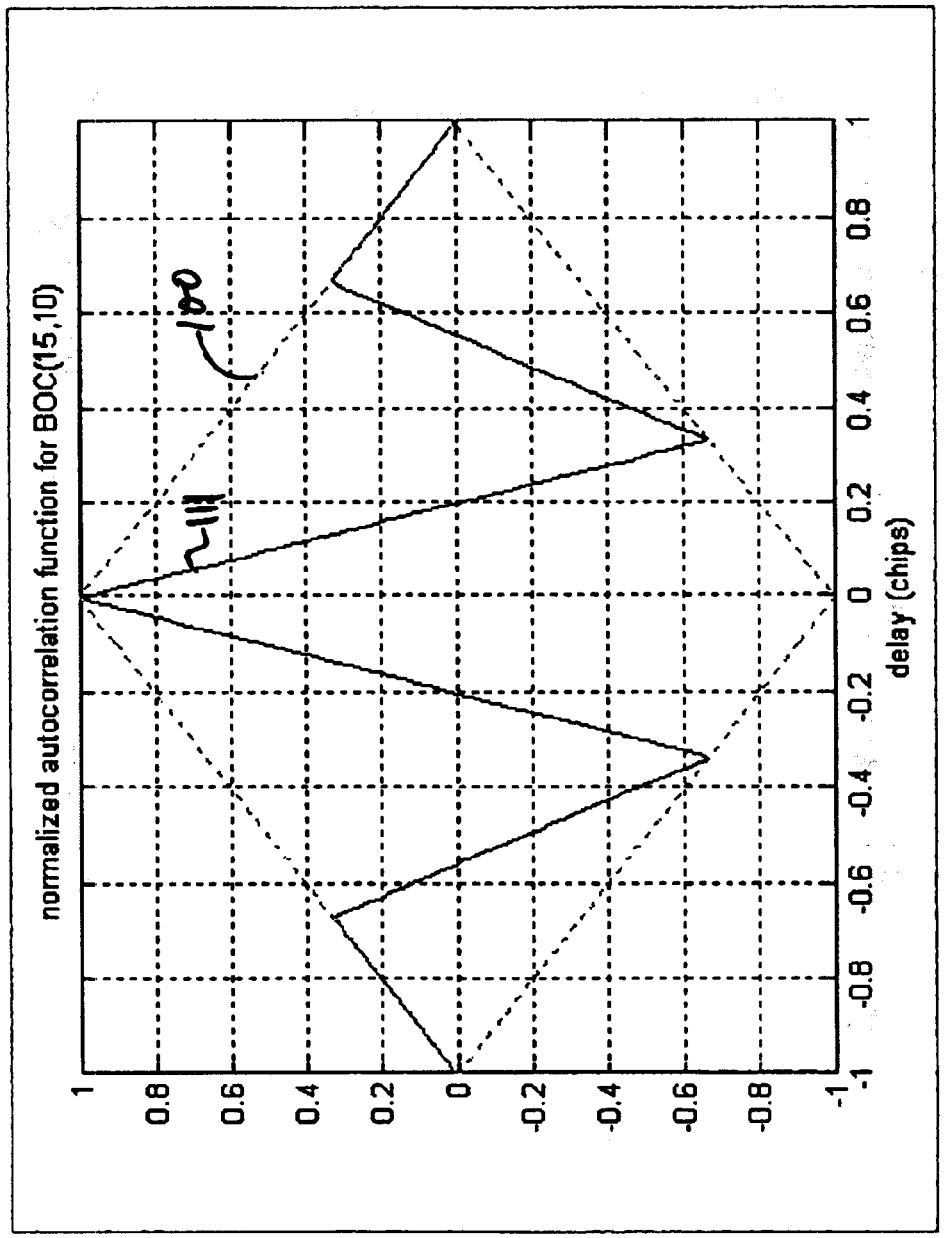
FIG. 2 depicts the normalized autocorrelation function associated with the signal depicted in FIG. 1.

The idealized normalized autocorrelation function for the AltBOC (15,10) signal is shown in FIG. 2. The envelope 100 of the autocorrelation function 111 is the autocorrelation function of a 10.23 MHz chipping rate signal and the multiple peaks of the autocorrelation function 111 are associated with the 15.3454 MHz subcarrier, which can be thought of as a complex square wave code.

The operations of a GNSS receiver 10 in tracking the AltBOC (15,10) Galileo satellite signals are discussed below. In Section 1, the operations for tracking the quadrature dataless pilot codes as a composite code are discussed. In Section 2 the operations for recovering the E5a and E5b data from the in-phase composite data codes are discussed. The discussion below assumes that the receiver has acquired the center frequency carrier using a conventional carrier tracking loop (not shown).

Section 1. Tracking the Composite Pilot Code

The AltBOC signal is given by:

$$x(t) = (c_1(t) + j \cdot c_3(t)) \cdot er(t) + (c_2(t) + j \cdot c_4(t)) \cdot er^*(t) \quad (1)$$

where $c_1$ is the in-phase E5b code, $c_2$ is the in-phase E5a code, $c_3$ is the quadrature E5b code and $c_4$ is the quadrature E5a code, and the E5b and E5a spreading codes are modulated, respectively, on the upper carrier $er(t)$ and the lower carrier $er^*(t)$, which is the complex conjugate of $er(t)$. The upper carrier $er(t)$ is:

$$er(t) = cr(t) + j \cdot sr(t)$$

where $cr(t) = \text{sign}(\cos(2\pi f_s t))$, $sr(t) = \text{sign}(\sin(2\pi f_s t))$ and $f_s$ is the subcarrier frequency. The lower carrier $er^*(t)$ is:

$$er^*(t) = cr(t) - j \cdot sr(t).$$

The composite pilot code, which is on the quadrature channel of the AltBOC (15,10) signal, includes the E5a and E5b quadrature codes $c_4(t)$ and $c_3(t)$. An expression $x_q(t)$ for the quadrature channel signal is derived from equation 1 by setting the in-phase channel codes to zero and substituting the expressions for the carriers:

$$x_q(t) = (j \cdot c_3(t)) \cdot (cr(t) + j \cdot sr(t)) + (j \cdot c_4(t)) \cdot (cr(t) - j \cdot sr(t)) \quad (2)$$

The terms of equation 2 can then be separated into real and imaginary components:

$$x_q(t) = (c_4(t) - c_3(t)) \cdot sr(t) + j \cdot (c_3(t) + c_4(t)) \cdot cr(t) \quad (3)$$

Figure 4:
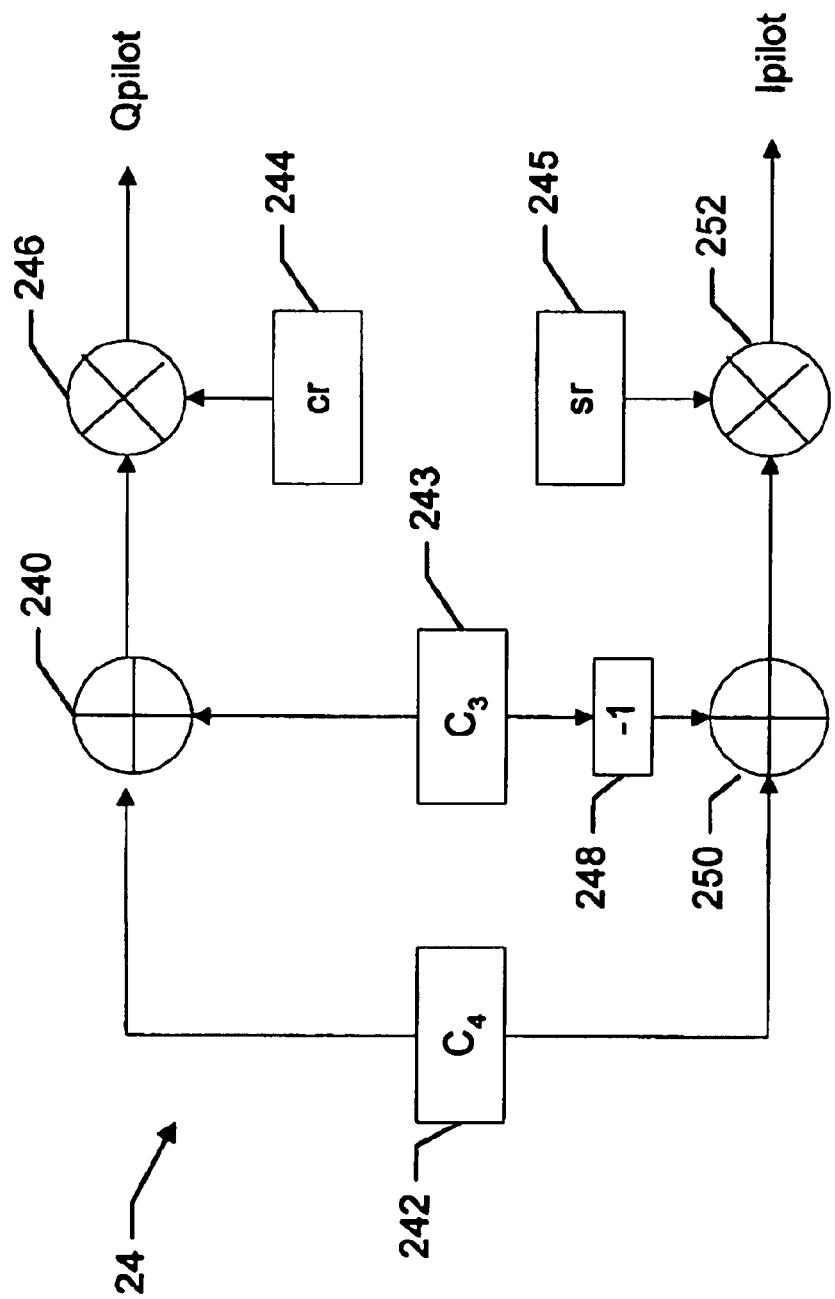
FIG. 4 is a functional block diagram of a local code generator that is included in the receiver of FIG. 3.

The receiver produces the local version of the complex composite pilot code by combining locally generated real and imaginary signal components, as discussed in more detail with reference to FIG. 4. The receiver then correlates the locally generated composite pilot code with the corresponding composite pilot code in the received signal, as discussed in more detail with reference to FIG. 5 below. The receiver then determines associated pseudoranges and its global position in a conventional manner.

Figure 3:
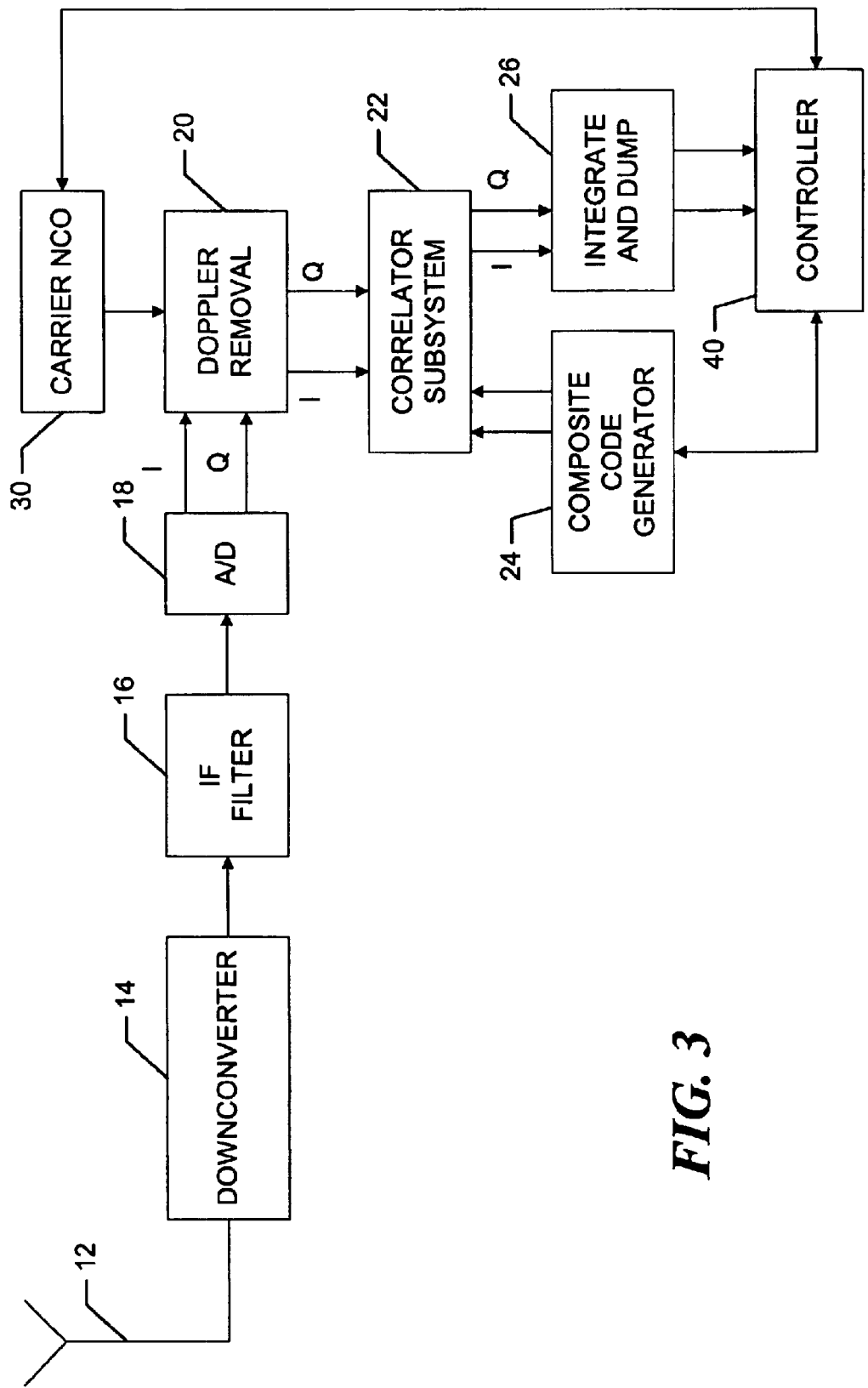
FIG. 3 is a functional block diagram of one channel for GNSS receiver.

Referring now to FIG. 3, a GNSS receiver 10 receives over an antenna 12 a signal that includes the AltBOC composite codes transmitted by all of the satellites that are in view. The received signal is applied to a downconverter 14 that, in a conventional manner, converts the received signal to an intermediate frequency ("IF") signal that has a frequency which is compatible with an analog-to-digital converter 18.

The IF signal is next applied to an IF bandpass filter 16 that has a bandpass at the desired center carrier frequency. The bandwidth of the filter 16 should be sufficiently wide to allow the primary harmonic of the AltBOC composite pilot code to pass, or approximately 1192 MHz. The wide bandwidth results in relatively sharp bit transitions in the received code, and thus, fairly well defined correlation peaks.

The analog-to-digital converter 18 samples the filtered IF signal at a rate that satisfies the Nyquist theorem and produces corresponding digital inphase (I) and quadrature (Q) signal samples in a known manner. The I and Q digital signal samples are supplied to a Doppler removal processor 20 that operates in a known manner, to produce baseband $I_{baseband}$ and $Q_{baseband}$ samples by rotating the signals in accordance with an estimate of the center frequency carrier phase angle. The estimate of the carrier phase angle is based in part on the signals produced by a carrier numerically controlled oscillator ("carrier NCO") 30, which is adjusted in accordance with carrier phase error tracking signals produced by a correlation subsystem 22. The operations of the correlator subsystem are discussed below with reference to FIG. 5.

The $I_{baseband}$ and $Q_{baseband}$ samples are next supplied to the correlator subsystem 22, which makes correlation measurements by multiplying the samples by early, prompt and late or early minus late versions of locally generated composite pilot codes produced by a composite code generator 24. The operations of the composite code generator and the correlator subsystem are discussed below with reference to FIGS. 4 and 5, respectfully. The I and Q correlation measurements associated with the early, prompt and late or early minus late versions of the local-composite pilot code are supplied to an integrate and dump circuit 26, which separately accumulates the respective I and Q measurements over predetermined intervals. At the end of each interval, the integrate and dump circuit 26 supplies the results of the respective I and Q accumulations, that is, the I and Q correlation signals, to a controller 40. The controller then controls the carrier NCO 30 and the composite code generator 24, to align the locally generated composite pilot code with the corresponding composite code in the received signal.

The GNSS receiver 10 tracks the AltBOC (15,10) signals using a locally generated composite pilot code that is generated from locally produced real and imaginary composite signal components. The operations performed by the composite code generator 24 to produce the locally generated composite pilot code components are now discussed in detail with reference to FIG. 4.

The composite code generator 24 includes $c_3$ and $c_4$ PRN code generators 242 and 243 that produce, respectively, local versions of the E5a and E5b PRN codes for a given GNSS satellite. The code generator 24 further includes two square wave generators 244 and 245 that produce values of cr and sr that correspond to the real and imaginary components of the upper and lower carriers er(t) and er*(t). As discussed in more detail below with reference to FIG. 5, the controller uses the correlation signals to control the relative timing of the locally produced $c_3$ and $c_4$ code chips and the transitions of the cr and sr square waves, which can be thought of as respective code patterns of 0, 1, 0 . . . , and so forth.

The composite code generator 24 adds together the $c_3$ and $c_4$ code chips in an adder 240 and multiplies the sum in multiplier 246 by the value of cr, which is sign($\cos(\pi f_s t)$), to produce the real component of the locally generated composite pilot code. The real component of the composite pilot code is hereinafter referred to as "$I_{pilot}$." The composite code generator produces the imaginary component of the composite pilot code by inverting the $c_3$ code chips in an inverter 248, adding the inverted $c_3$ code chip to the corresponding $c_4$ code chip in an adder 250 and, in multiplier 252, multiplying the result by sr, which is sign($\sin(\pi f_s t)$). The imaginary component of the locally generated composite pilot code is hereinafter referred to as "$Q_{pilot}$." The local replica of the composite pilot code is then the sum:

$$y_{pilot}(t) = I_{pilot} - j \cdot Q_{pilot}.$$

As discussed in more detail below, the correlator subsystem 22 multiplies the received composite pilot code by the locally generated composite pilot code. Based on the results, the controller 40 adjusts the PRN code and square wave generators 242–245 to align the local code to the received code.

Figure 5:
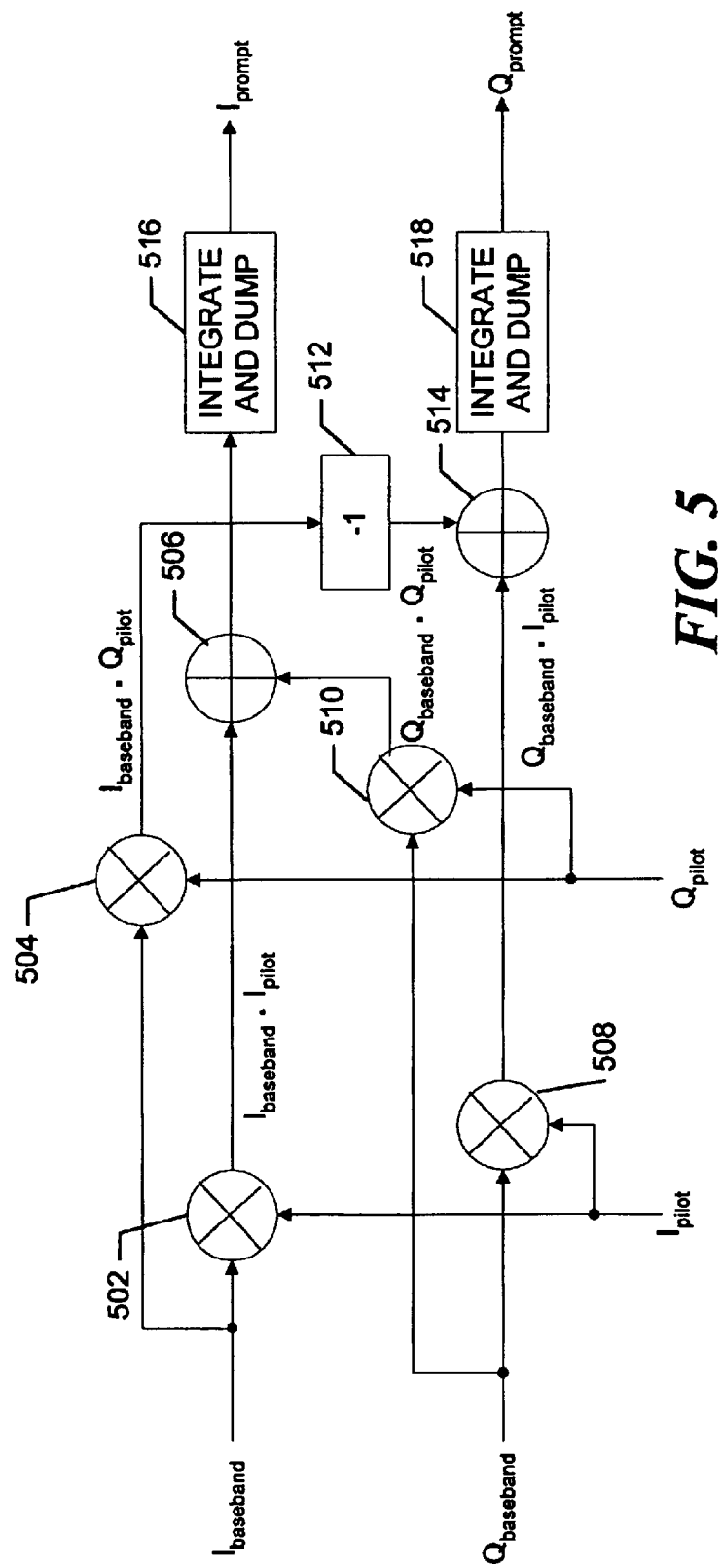
FIG. 5 is a functional block diagram of a correlator subsystem that is included in the receiver of FIG. 4.

Referring now to FIG. 5, the operations of the correlator subsystem 22 are explained in terms of the operations involving the prompt version of the locally generated composite pilot code. The receiver includes similar circuits for early and late or early-minus-late versions of the locally generated composite pilot code that operate as part of a delay lock loop, or DLL, which operates in a known manner to produce an associated DLL error signal.

The correlation subsystem 22 multiplies together two complex signals, namely, the locally generated composite pilot code and the received composite signal. The correlator subsystem thus performs the operation:

$$y_{correlated}(t) = (I_{baseband} + j \cdot Q_{baseband}) \cdot (I_{pilot} - j \cdot Q_{pilot})$$

Multiplying out the terms and separating the real and imaginary components produces the correlation signal:

$$y_{correlated}(t) = (I_{baseband} \cdot I_{pilot} + Q_{baseband} \cdot Q_{pilot}) + j \cdot (Q_{baseband} \cdot I_{pilot} - I_{baseband} \cdot Q_{pilot})$$

As depicted in FIG. 5, the correlation subsystem manipulates the baseband signals $I_{baseband}$ and $Q_{baseband}$ provided by the Doppler removal processor 20 and the locally-generated real and imaginary signal components $I_{pilot}$ and $Q_{pilot}$ provided by the code generator 24, to produce the real and imaginary components of the correlation signal. The correlation subsystem 22 multiples the $I_{baseband}$ signal by the $I_{pilot}$ signal in multiplier 502, and the $Q_{baseband}$ signal by the $Q_{pilot}$ signal in multiplier 510. An adder 506 then adds the two products together and provides the result to an integrate and dump circuit 516. The integrate and dump circuit 516 accumulates the sums produced by the adder 506 and at appropriate times produces a corresponding real component, or $I_{prompt}$, signal. To produce the imaginary components, the correlation subsystem multiplies the $Q_{baseband}$ signal by the $I_{pilot}$ signal in a multiplier 508 and multiplies the $I_{baseband}$ signal by the $Q_{pilot}$ signal in a multiplier 504. The product produced by the multiplier 504 is inverted by inverter 512 and added to the product produced by the multiplier 508 in an adder 514. The adder 514 then supplies the sums to the integrate and dump circuit 518, which accumulates the sums and at appropriate times produces a corresponding $Q_{prompt}$ signal.

The controller 40 (FIG. 3) manipulates the $I_{prompt}$ and $Q_{prompt}$ signals, to determine the center carrier tracking phase error as the arctangent of $Q_{prompt}/I_{prompt}$. The phase error signal is then used, in a known manner, to control the carrier NCO 30, which in turn controls the Doppler removal processor 20.

As discussed above, the controller 40 also receives early and late or early-minus-late I and Q correlation signals. Based on these signals the controller 40 adjusts the generators 242–245 to align the local composite code in the received code and thus minimize the associated DLL error signal.

Section 2. Recovering the Data from the Composite In-Phase Signals

The AltBOC (15,10) signals include both data and spreading codes on the E5a in-phase and E5b in-phase channels. The E5a in-phase channel will carry data that is transmitted at a particular data rate and the E5b in-phase channel will carry different data that is transmitted at a different data rate. The data transitions on the E5a and E5b in-phase channels will, however, occur at corresponding times. The GNSS receiver 10 acquires and tracks the AltBOC (15,10) signal using the composite pilot code, as discussed above. After the removal of the carrier, the receiver recovers the data from the composite in-phase signal using a separate set of correlators, as discussed in more detail below with reference to FIG. 10.

The AltBOC(15,10) complex in-phase baseband signal, that is, the signal with the quadrature pilot codes set to zero is:

$$x_i(t) = A \cdot e^{-j\phi} \cdot (c_1(t) \cdot e^{j2\pi f_s t} + c_2(t) \cdot e^{-j2\pi f_s t})$$

where the subcarrier is included in the expression as a sinusoid instead of the corresponding rectangular functions cr(t)±sr(t) and assuming, for the moment, that $c_1(t)$ and $c_2(t)$ are free of data. Note that the term $c_1(t) \cdot e^{j2\pi f_s t} + c_2(t) \cdot e^{-j2\pi f_s t}$ is similar to the expression for the quadrature spreading, or PRN, codes discussed in Section 1 above.

If the baseband in-phase signal is correlated with a local replica of the composite in-phase spreading code, the result is:

$$\Sigma x_i(t)=A\cdot e^{-j\phi}\cdot E<(c_1(t)\cdot e^{j2\pi f_s t}+c_2(t)\cdot e^{-j2\pi f_s t})\cdot(c_1(t+\tau)\cdot e^{j2\pi f_s(t+\tau)}+c_2(t+\tau)\cdot e^{-j2\pi f_s(t+\tau)})^*>$$

multiplying terms:

$$\sum x_i(t) = A\cdot e^{-j\phi}\cdot \begin{pmatrix} R_1(\tau)\cdot e^{-j2\pi f_s\tau}+R_2(\tau)\cdot e^{j2\pi f_s\tau}+ \\ E\langle c_1(t)\cdot c_2(t+\tau)\cdot e^{j4\pi f_s\tau}\cdot e^{j2\pi f_s\tau}+c_1(t+\tau)\cdot c_2(t)\cdot e^{-j4\pi f_s\tau}\cdot e^{-j2\pi f_s\tau}\rangle \end{pmatrix}$$

where $R_k$ denotes the auto-correlation function for signal k. The cross-terms will be filtered over the predetection interval, particularly since the E5a and E5b in-phase spreading codes are designed to have low cross-correlation values. Removing the cross-terms and expanding the complex exponentials the expression becomes:

$\Sigma x_i(t)=A\cdot e^{-j\phi}\cdot($ $R_1(\tau)\cdot\cos(2\pi f_s\tau)-j\cdot R_1(\tau)\pi\sin($ $2\pi f_s\tau)+R_2(\tau)\cdot\cos(2\pi f_s\tau)+$ $j\cdot R_2(\tau)\cdot\sin(2\pi f_s\tau))=A\cdot e^{-j\phi}\cdot((\,$ $R_1(\tau)+R_2(\tau))\cdot\cos(2\pi f_s\tau)+j\cdot(\,$ $R_2(\tau)-R_1(\tau))\cdot\sin(2\pi f_s\tau))$ In the case of datafree signals, the autocorrelation functions $R_1$ and $R_2$ will be equal and the expression simplifies to:

$\Sigma x_1(t)=A\cdot e^{-j\phi}\cdot(R(\tau)\cdot\cos(2\pi f_s\tau))$

Figure 6:
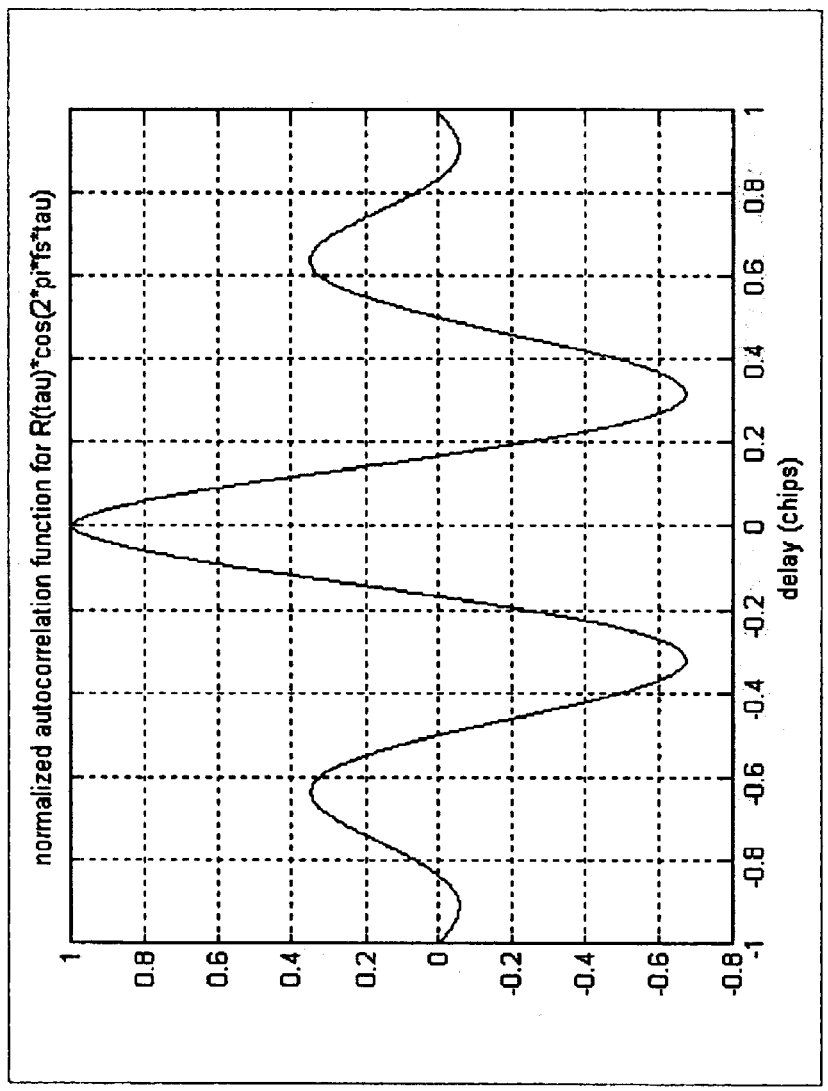
FIG. 6 depicts an autocorrelation function associated with the AltBOC in phase channel.

The corresponding correlation function is depicted in FIG. 6. Note that this is similar to the correlation function for the composite quadrature pilot code, which is shown in FIG. 2.

Figure 7:
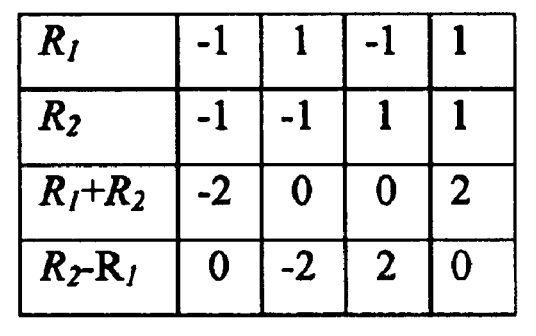

If the assumption that the E5a and E5b in-phase codes $c_1(t)$ and $c_2(t)$ are datafree is removed, the maximum normalized ideal value of the individual correlation functions $R_1$ and $R_2$, and their sum and differences are shown in the table of FIG. 7. Accordingly, the original data sequence can be recovered if the receiver recovers both $(R_1+R_2)$ and $(R_2-R_1)$ from the composite in-phase signal.

Figure 8:
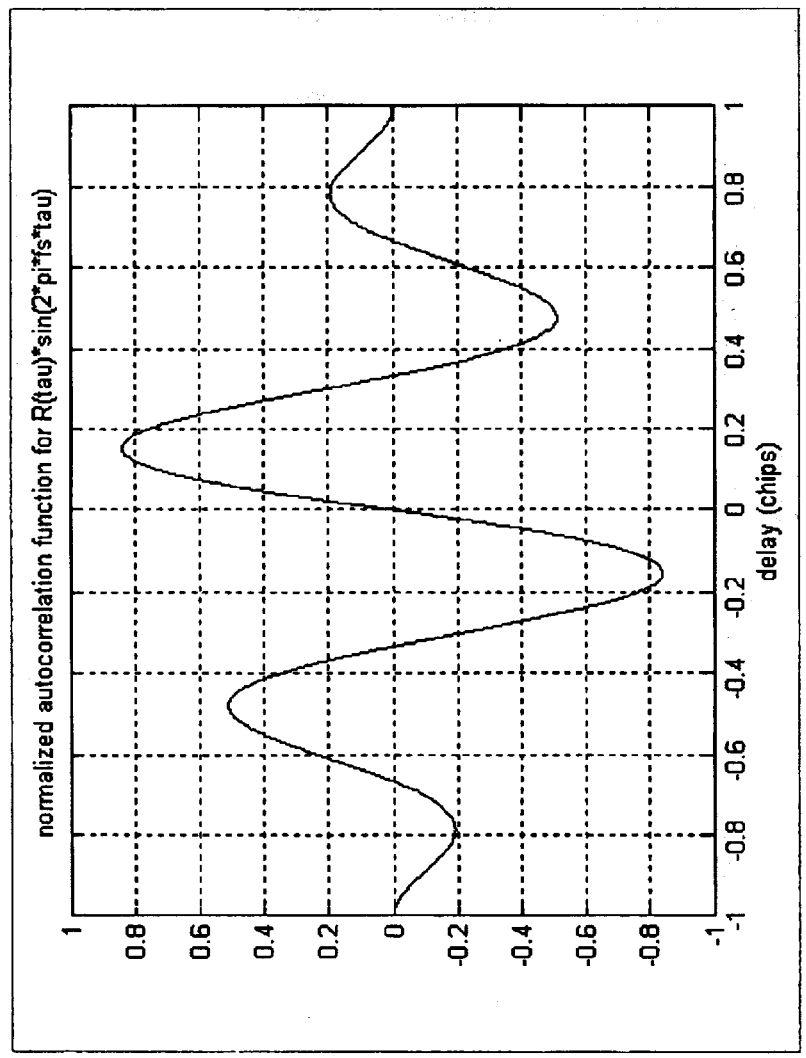
FIG. 8 depicts another autocorrelation function associated with the AltBOC in phase channel.

The receiver may recover the $(R_1+R_2)$ data directly from the in-phase $I_{prompt}$ signal. However, the recovery of the $(R_2-R_1)$ data is not as straight forward. As depicted in FIG. 6, the $R_1+R_2$ component of the in-phase composite signal, namely, $(R_1(\tau)+R_2(\tau))\cdot\cos(2\pi f_s\tau)$ has an autocorrelation function that is similar to the autocorrelation function of the composite quadrature channel signal. However, as depicted in FIG. 8, the $R_1-R_2$ signal component of the in-phase composite signal $j\cdot(R_2(\tau)-R_1(\tau))\cdot\sin(2\pi f_s\tau)$ does not have a similar autocorrelation function because the sin term goes to zero when $\tau$ goes to zero.

To compensate for the sin term going to zero when $\tau$ goes to zero, a correlation operation could be offset so that the operation tracks the correlation peak that corresponds to $j\cdot(R_2(\tau)-R_1(\tau))\cdot\sin(2\pi f_s\tau)$ and the $(R_2-R_1)$ data sequence may then be read from the $Q_{prompt}$ correlator, but with reduced power.

Alternatively, the circuitry that generates the local version of the composite signal may instead generate a signal that produces for the $(R_2-R_1)$ term the autocorrelation function $(R_2(\tau)-R_1(\tau))\cdot\cos(2\pi f_s\tau)$. The local in-phase composite signal thus becomes:

$(c_1(t)\cdot e^{j2\pi f_s t}-c_2(t)\cdot e^{-j2\pi f_s t})$

Figure 9:
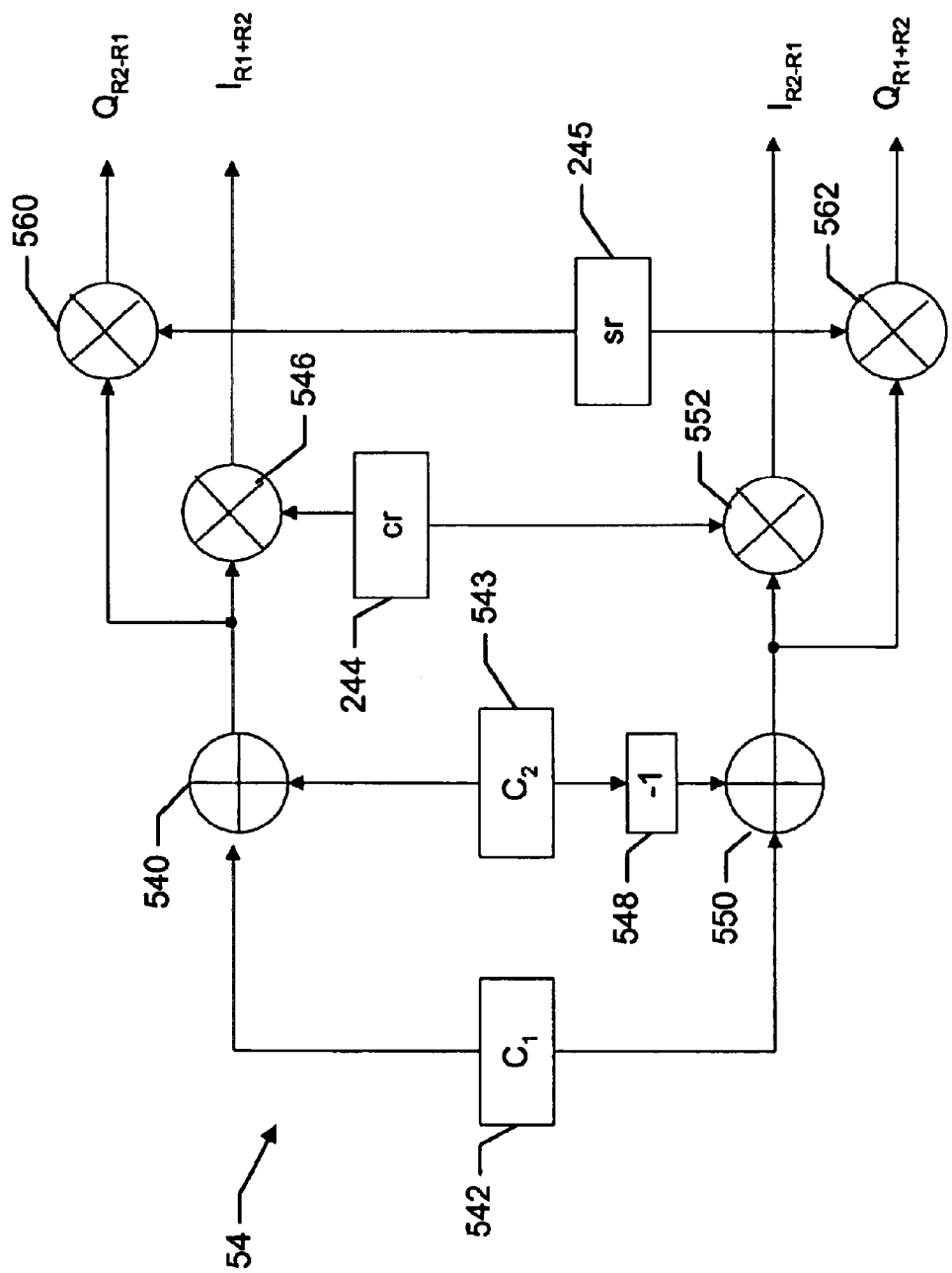
FIG. 9 is a functional block diagram of a local code generator.

To demodulate the data using this method, the receiver locally produces two combinations of the $c_1(t)$ and $c_2(t)$ spreading codes, namely, combinations that correspond, respectively, to the $R_1+R_2$ data and the $R_2-R_1$ data. To recover the $(R_1+R_2)$ data the receiver produces the local signal:

$x_1(t)_{R_1=R_2}=(c_1(t)+c_2(t))\cdot cr(t)+j\cdot(c_1(t)-c_2(t))\cdot sr(t)=I_{R_1=R2}+j\cdot Q_{R_2-R_1}$ To recover the $(R_2-R_1)$ data the receiver produces the local signal:

$x_1(t)_{R_2-R_1}=(c_1(t)+c_2(t))\cdot cr(t)+j\cdot(c_1(t)-c_2(t))\cdot sr(t)=I_{R_2-R1}+j\cdot Q_{R_2-R_1}$ Referring now to FIG. 9, the real and imaginary components of the $R_2-R_1$ and $R_1+R_2$ combinations are locally produced by a code generator 54, which may be part of the local composite code generator 24 (FIG. 3). To produce the real component of the $R_1+R_2$ combination, the code generator adds together the $c_1$ and $c_2$ codes in an adder 540 and multiplies the result by the square wave code cr in a multiplier 546. To produce the imaginary component of the $R_1+R_2$ combination, the code generator adds together the $c_1$ code and an inverted $c_2$ code in an adder 550 and multiples the result by the square wave code sr in a multiplier 562. The generator also multiplies the sum $c_1+c_2$ produced by the adder 540 by the square wave code sr in a multiplier 560, to produce the imaginary component of the $R_2-R_1$ combination. The generator further multiplies the sum $c_1-c_2$ produced by the adder 550 by the square wave code cr in a multiplier 522, to produce the real component of the $R_2-R_1$ code.

The receiver then uses the locally produced real and imaginary components of the $R_1+R_2$ and $R_2-R_1$ combinations to recover the data from the composite in-phase code.

Figure 10:
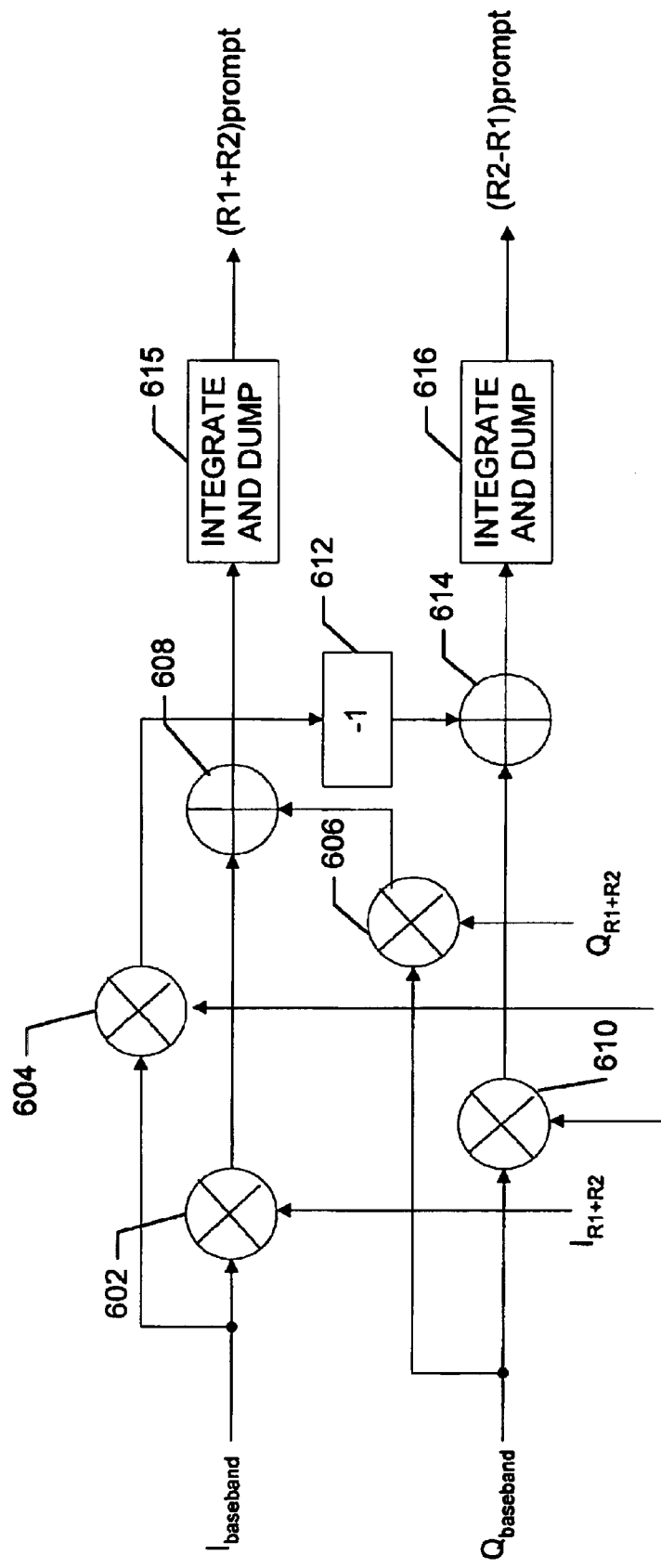
FIG. 10 is a functional block diagram of a correlator subsystem.

Referring now to FIG. 10, the system multiplies the in-phase baseband signal $I_{baseband}$ by the real component of $R_1+R_2$ in a multiplier 602, and the quadrature baseband signal $Q_{baseband}$ by the imaginary component of $R_1+R_2$ in a multiplier 606. The products produced by the multipliers 602 and 606 are then added together in an adder 608 and the sum provided to an integrate and dump circuit 615. To produce the correlation signal relating to $R_1-R_2$, the correlation subsystem multiplies the quadrature baseband signal $Q_{baseband}$ by the imaginary component of $R_2-R_1$ in a multiplier 610. Further, the system multiplies the real component of the baseband signal $I_{baseband}$ by the real component of $R_2-R_1$, in a multiplier 604 code. The two sums are added together in an adder 612 and provided to an integrate and dump circuit 616. The integrate and dump circuits 615 and 616 accumulate the correlation values produced by the adders 608 and 612, respectively, and at appropriate times produce the $R_1+R_{2prompt}$ and $R_1-R_{2prompt}$ signals. The results are then used to recover the data in accordance with the chart of FIG. 7.

Figure 11:
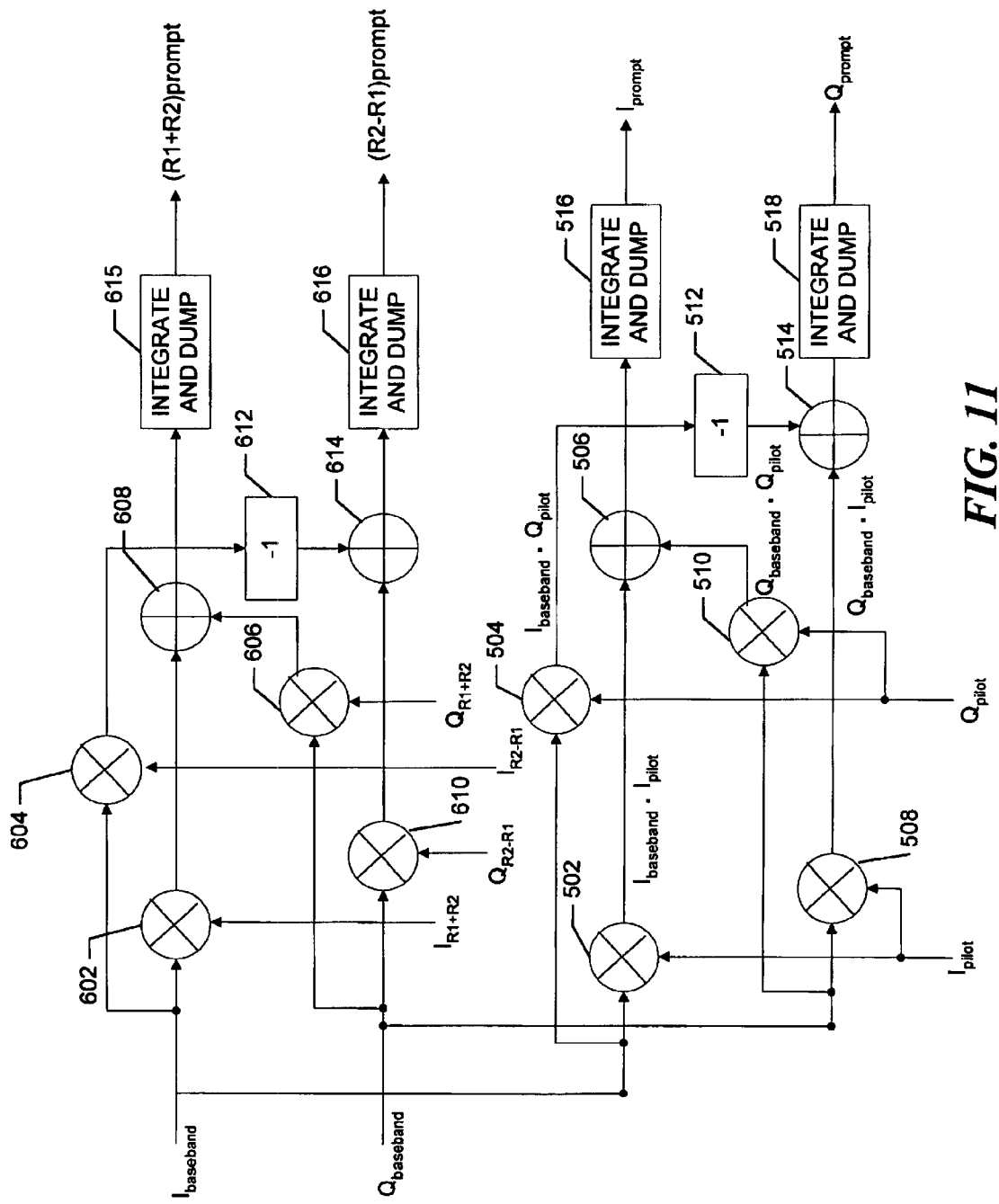
FIG. 11 is a functional block diagram that combines the correlator subsystems of FIGS. 5 and 10.

The circuitry of FIGS. 5 and 10 can be combined, as depicted in FIG. 11, to produce a system that tracks the quadrature AltBOC composite code and recovers E5a and E5b data from the in phase AltBOC composite code.

What is claimed is:

1. A receiver for use with a global navigation satellite system that transmits Alternate binary offset carrier, or AltBOC signals, the receiver including:

A. a local composite code generator that produces a local version of an AltBOC composite code as combinations of locally produced real and imaginary code components;

B. a correlation subsystem that produces correlation signals, the correlation subsystem correlating the locally produced composite code with the composite code in a received AltBOC signal by combining products produced by multiplying baseband inphase and quadrature components of the received signal by the locally produced real and imaginary composite code components;

C. a controller that receives correlation signals from the correlation subsystem and adjusts the local composite code generator to align the local composite code with the corresponding composite code in the received AltBOC signal, the controller determining associated pseudoranges based on timing differences between the time the AltBOC composite code is transmitted and the time the code is received.

2. The receiver of claim 1 wherein the local composite code generator includes square wave code generators that produce real and imaginary components of upper and lower carriers, a first PRN code generator that produces a first code that is modulated on the upper carrier, a second PRN code generator that produces a second code that is modulated on the lower carrier, and adders and multipliers that multiply the first and second codes by the real and imaginary components of the upper and lower carriers and combine the products to produce the real and imaginary components of the local composite code.

3. The receiver of claim 2 wherein the local code generator further produces combinations that correspond respectively to a sum and a difference of a first autocorrelation function that is associated with the first code and a second autocorrelation function that is associated with the second code, the correlation system produces combination correlation signals that correspond to the respective combinations, and the controller recovers data from the first and second codes in the received signal based on the combination correlation signals.

4. A local code generator for a receiver for use with a global navigation satellite system that transmits Alternate binary offset carrier, or AltBOC signals, the local code generator including:

A. a first code generator that produces a local version of a first code that is modulated on an upper carrier;

B. a second code generator that produces a local version of a second code that is modulated on a lower carrier;

C. a first square wave generator that produces a first square wave that corresponds to the respective real components of the upper and lower carriers;

D. a second square wave generator that produces a second square wave that corresponds to the respective imaginary components of the upper and lower carriers;

E. one or more adders that combine the first and second codes to produce associated sums; and F. one or more multipliers that multiply the sums by the first and second square waves to produce real and imaginary components of the composite code.

5. The local code generator of claim 4 wherein the one or more adders include one or more inverters for selectively inverting the codes.

6. The local code generator of claim 5 wherein the code generated corresponds to a dataless composite pilot code.

7. The local code generator of claim 5 wherein the one or more multipliers further multiply each sum separately by the first and second square waves to produce real and imaginary components of respective associated combination correlation signals.

8. A method of determining global position from Alternate binary offset carrier, or AltBOC, signals received from a global navigation satellite system, the method including the steps of:

A. producing a local version of an AltBOC composite code as combinations of locally produced real and imaginary code components;

B. producing in-phase and quadrature components of the received AltBOC signal;

C. correlating the locally produced composite code with the composite code in the received AltBOC signal by combining products produced by multiplying the baseband inphase and quadrature components of the received AltBOC signal by the locally produced real and imaginary composite code components to produce associated correlation signals;

D. adjusting the local composite code generator based on the correlation signals to align the local composite code with the corresponding composite code in the received AltBOC signal; and E. determining global position based on the timing differences between the local and the received AltBOC composite codes from at least three global navigation satellites.

9. The method of claim 8 wherein the step of producing the local version of the AltBOC composite code includes the steps of producing square waves that correspond to real and imaginary components of upper and lower carriers, producing a first code that is modulated on the upper carrier, producing a second code that is modulated on the lower carrier, and selectively combining the first and second codes and multiplying the results by the real and imaginary components of the upper and lower carriers.

10. The method of claim 8 wherein the step of selectively combining the first and second codes includes the steps of producing first and second sums that are associated respectively with the real and imaginary components, the first sum corresponding to the addition of the second code to an inverted first code and the second sum corresponding to the addition of the two codes.

11. The method of claim 9 further including the step of recovering data from the composite AltBOC codes by producing two combinations of the first and second codes and first and second square waves that correspond to real and imaginary components of $R_1+R_2$ and $R_2-R_1$, where $R_k$ is the autocorrelation function for a signal k, and the associated values of the two combinations determine the values of corresponding data included in the first and second codes.

* * * * *